(12) United States Patent
Nattukallingal et al.

(10) Patent No.: US 12,253,683 B2
(45) Date of Patent: Mar. 18, 2025

(54) USER INTERFACES PROVIDED BY WEARABLE SMART EYE-GLASSES

(71) Applicant: Nimo Planet, Inc., Milpitas, CA (US)

(72) Inventors: Rohildev Nattukallingal, Tirur (IN); Fenil Paul, Ernakulam (IN)

(73) Assignee: Nimo Planet, Inc., Milpitas, CA (US)

( * ) Notice: Subject to any disclaimer, the term of this patent is extended or adjusted under 35 U.S.C. 154(b) by 56 days.

(21) Appl. No.: 18/365,275

(22) Filed: Aug. 4, 2023

(65) Prior Publication Data
US 2023/0375845 A1 Nov. 23, 2023

Related U.S. Application Data

(63) Continuation of application No. 17/646,490, filed on Dec. 30, 2021, now Pat. No. 11,860,373.

(30) Foreign Application Priority Data

Dec. 30, 2020 (IN) .............................. 202041027860

(51) Int. Cl.
*G06F 3/0482* (2013.01)
*G02B 27/01* (2006.01)
(Continued)

(52) U.S. Cl.
CPC ....... *G02B 27/0179* (2013.01); *G02B 27/017* (2013.01); *G06F 3/013* (2013.01);
(Continued)

(58) Field of Classification Search
CPC .............. G02B 27/0179; G02B 27/017; G02B 2027/0118; G02B 2027/0138;
(Continued)

(56) References Cited

U.S. PATENT DOCUMENTS

| | | | |
|---|---|---|---|
| 2012/0131495 A1* | 5/2012 | Goossens | G06F 3/0482 715/781 |
| 2017/0060360 A1* | 3/2017 | Ording | G06F 9/451 |
| 2019/0155382 A1* | 5/2019 | Ikuta | G09G 5/00 |

OTHER PUBLICATIONS

Stuart Elder et al., A Technical Evaluation of Devices for Smart Glasses Applications, Sep. 1, 2015, Internet Technologies and Applications, pp. 98-103 (Year: 2015).*

(Continued)

*Primary Examiner* — Tam T Tran
(74) *Attorney, Agent, or Firm* — IPHORIZONS PLLC; Narendra Reddy Thappeta

(57) ABSTRACT

An aspect of the present disclosure is directed to techniques performed by a processing system associated with a wearable smart eye-glass. In an embodiment, a first digital data representing multiple digital workspaces is sent from the processing system to the smart eye-glass to cause display of the multiple digital workspaces in a same duration as part of virtual display interface. Upon receiving selection of a first digital workspace, the user is enabled to interact with the first digital workspace. According to another aspect, a second digital data representing one or more objects is sent to the smart eye-glass to cause display of the one or more objects in the first digital workspace. Upon receiving a selection of a first object, a first software program corresponding to the selected first object is instantiated. The instantiating includes creating a first window corresponding to the first software program in the first digital workspace.

18 Claims, 17 Drawing Sheets

(51) Int. Cl.
*G06F 3/01* (2006.01)
*G06F 3/0485* (2022.01)

(52) U.S. Cl.
CPC ............ *G06F 3/017* (2013.01); *G06F 3/0482* (2013.01); *G06F 3/0485* (2013.01); *G02B 2027/0118* (2013.01); *G02B 2027/0138* (2013.01); *G02B 2027/014* (2013.01); *G02B 2027/0187* (2013.01)

(58) Field of Classification Search
CPC ...... G02B 2027/014; G02B 2027/0187; G06F 3/013; G06F 3/017; G06F 3/0482; G06F 3/0485
See application file for complete search history.

(56) References Cited

OTHER PUBLICATIONS

Anton Ivaschenko et al., Industrial Application of Accented Visualization Based on Augmented Reality, Apr. 1, 2019, Proceeding of the 24th Conference of Fruct Association, pp. 1-7 (Year: 2019).*

* cited by examiner

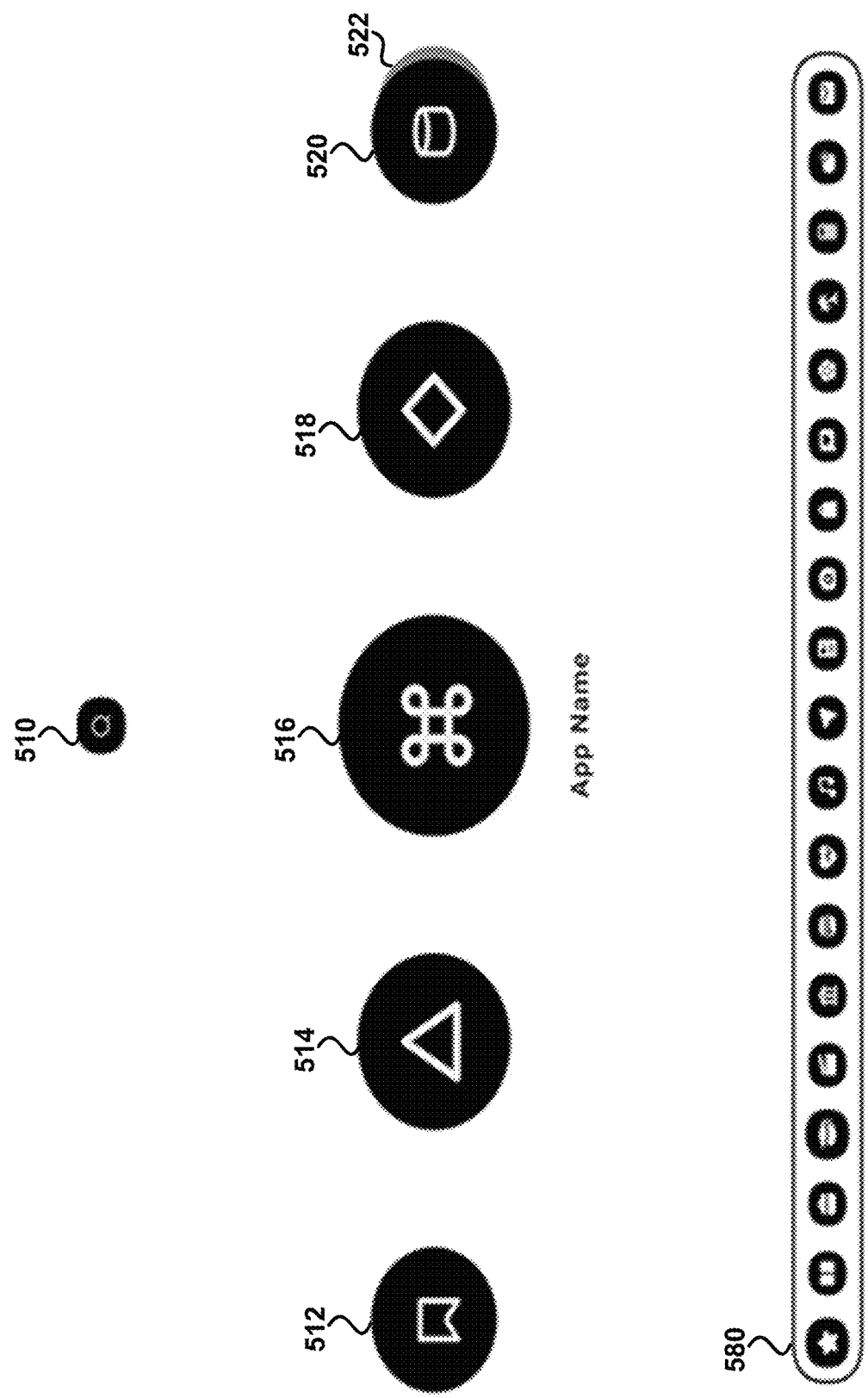

USER INTERFACES PROVIDED BY WEARABLE SMART EYE-GLASSES

RELATED APPLICATIONS AND PRIORITY CLAIM

The present application is a continuation application of, and claims priority from, co-pending US patent application entitled, "USER INTERFACES PROVIDED BY WEARABLE SMART EYE-GLASSES", application Ser. No. 17/646,490, Filed: Dec. 30, 2021, which claims priority from the India provisional patent application entitled, "POSITIONING AND INTERACTION OF WORKSPACE AND APPLICATION IN WEARABLE HEAD-MOUNTED DEVICES FOR ENHANCED PRODUCTIVITY AND EFFICIENT UTILISATION OF SPATIAL COMPUTING", Application No.: 202041027860, India Filing Date: 30 Dec. 2020, naming as inventors Rohildev Nattukallingal and Fenil Paul, which is incorporated in its entirety herewith.

BACKGROUND OF THE DISCLOSURE

Technical Field

The present disclosure relates generally to wearable devices and more specifically to providing virtual user interfaces with eye-glasses.

Related Art

Eye-glasses are generally worn by users on eyes for viewing various scenes. Smart eye-glasses refer to a class of eye-glasses which operate to generate the scenes viewed based on digital content and/or commands. In other words, the user views (experiences) scenes generated by the worn eye-glasses based on the digital content, as is well known in the relevant arts.

User interfaces refer to scenes that are displayed and/or how the user is able to interact with the content of the scenes, as is also well known in the relevant arts. Aspects of the present disclosure are directed to user interfaces provided by wearable devices.

BRIEF DESCRIPTION OF THE DRAWINGS

Example embodiments of the present disclosure will be described with reference to the accompanying drawings briefly described below.

FIGS. 3, 4, 5A-5B, 6, 7, 8, 9A-9B and 10A-10D depict various example user interfaces provided by smart eye-glasses of present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Definitions

Figure 1:
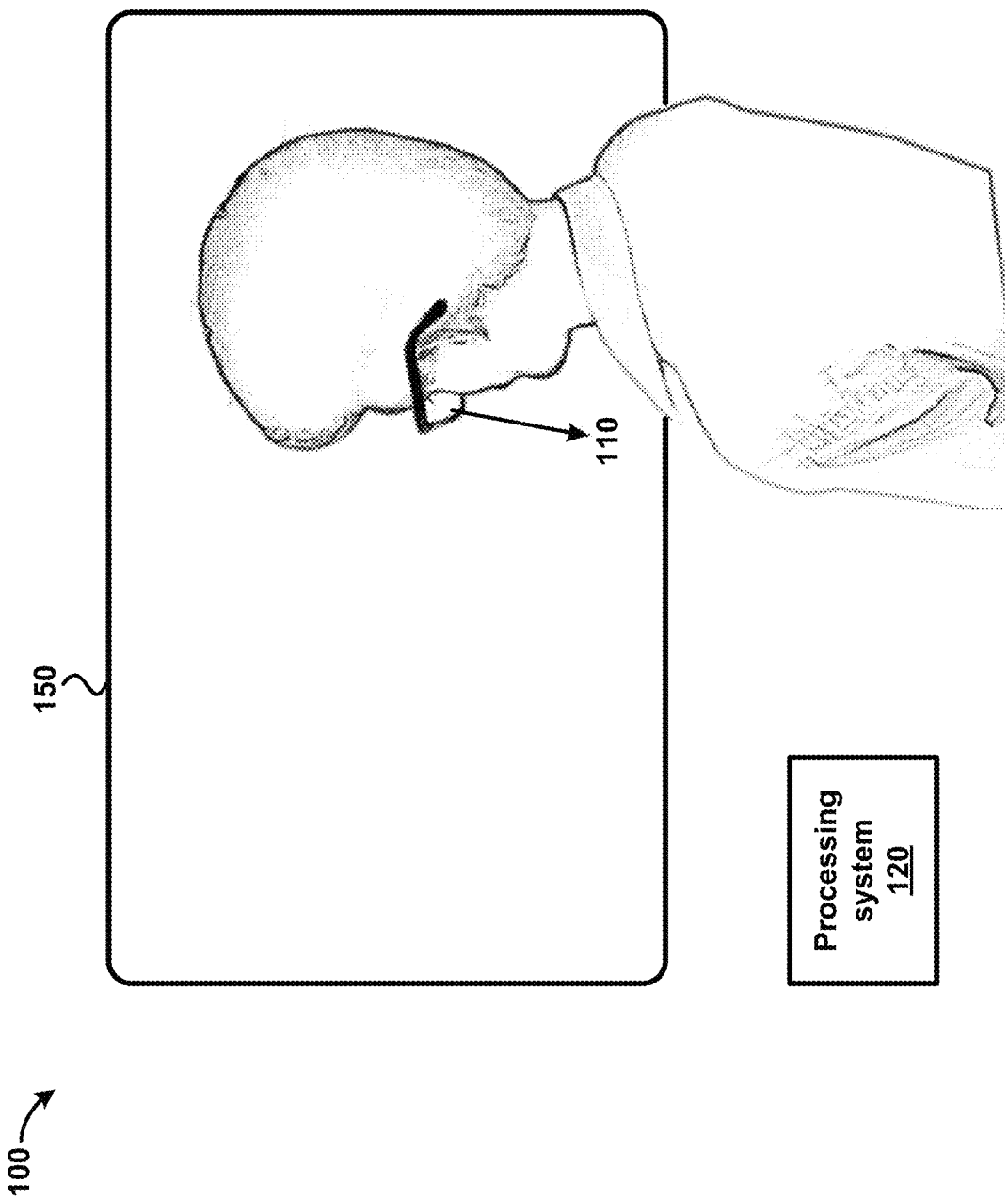
FIG. 1 illustrates an example environment in which several aspects of the present disclosure can be implemented.

A window is a graphical interface element using which an executing software program receives any needed inputs from and provides (e.g., display text or graphic icons) output to users. The inputs and output form the basis for convenient interaction between users and the software program, as is well known in the relevant arts.

A digital workspace, as used in the instant patent application, represents a graphical interface element which provides a user experience akin to a desktop well known in the computer user interfaces. As with desktop interfaces associated with the computer screens, multiple windows and objects/icons can be displayed within the confines of each digital workspace. Many of the displayed objects can be selected to instantiate corresponding software programs.

2. Overview

An aspect of the present disclosure is directed to techniques performed by a processing system associated with a wearable smart eye-glass. In an embodiment, a first digital data representing multiple digital workspaces is sent from the processing system to the smart eye-glass to cause display of the multiple digital workspaces in a same duration (simultaneously) as a part of a virtual display interface (VDI). A first signal indicating the selection of a first digital workspace of the multiple digital workspaces by the user is received. The user is enabled to interact with the first digital workspace of the multiple digital workspaces.

In an embodiment, the received first signal indicates any one of or any combination of eye gaze of the user, field of view of the user, gestures of the user, voice commands from the user, control signals received from an input device associated with the user. The enabling includes identifying the first digital workspace by processing the received first signal.

According to another aspect, as part of the enabling, a second digital data representing one or more objects is sent to the smart eye-glass to cause display of the one or more objects in the first digital workspace. A second signal indicating a selection of a first object from the one or more objects is received. A first software program corresponding to the selected first object is instantiated, wherein the instantiating includes creating a first window corresponding to the first software program in the first digital workspace.

According to another aspect, the first software program is suspended upon determining that the user has not interacted with the first digital workspace for a period more than a first threshold period. Last state of the first software program before suspension is captured. The first software program is resumed at a later time in response to detecting a user interaction with said first digital workspace.

According to yet another aspect, a first set of the digital workspaces are designated as static digital workspaces, wherein sizes, layouts and positions of windows in the static digital workspaces remain static. A second set of the digital workspaces are designated as dynamic digital workspaces, wherein sizes, layouts and positions of windows in the dynamic digital workspaces are variable.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 illustrates example environment 100 in which several aspects of the present disclosure can be implemented. Example environment 100 is shown containing smart eye-glasses 110 worn by a user, processing system 120 and virtual display interface (VDI) 150. Example environment 100 is shown with a representative set of components merely for illustration, though typical environments employing aspects of the present disclosure can have many more types and number of systems.

Smart eye-glasses 110 operate to generate the user interfaces based on digital content and/or commands received from processing system 120. The user interfaces are provided as part of VDI 150. The user interfaces provided by smart eye-glasses 110 may change based on interactions of the user with the user interfaces. Smart eye-glasses 110 correspond to any one of several smart eye-glasses widely available in the market place, as will be apparent to a skilled practitioner.

Processing system 120 is communicatively coupled to smart eye-glasses 110, and may communicate with smart eye-glasses 110 using wire-based or wireless communication technologies (such as Bluetooth, WiFi etc., not shown). Processing system 120 provides the digital content and/or commands based on which smart eye-glasses 110 generate the user interfaces viewed by the user. Processing system 120 may contain a memory storing software programs (such as an operating system), which when executed, cause processing system 120 to provide the digital content/signals and or commands to smart eye-glasses 110.

Processing system 120 may receive signals corresponding to the user interactions with the user interfaces, and may cause smart eye-glasses 110 to generate/change user interfaces based on the user interactions. In general, processing system 120 is to be implemented consistent with the design of smart eye-glasses 110, and the combination can be implemented in a known way.

Though not shown in FIG. 1, processing system 120 may also be communicatively connected to one or more sensors (not shown), and may receive inputs from the one or more sensors. In an example embodiment, the one or more sensors are integrated with smart eye-glasses 110. Processing system 120 may receive signals corresponding to the user interactions from the one or more sensors communicatively connected to processing system 120. Further, though processing system 120 is shown as a separate component/device in the example environment of FIG. 1, in alternative embodiments, processing system 120 may be integrated into (i.e., form a part of) smart eye-glasses 120.

Virtual display interface (VDI) 150 represents the overall visual experience provided by smart eye-glasses 110 according to aspects of the present disclosure. VDI 150 is said to be virtual since there is no physical screen on which the user interfaces are displayed. The content depicted for VDI 150 represents a snapshot at a specific time instance, but the content varies as the user interacts with VDI 150 according to aspects of the present disclosure.

Existing processing systems 120 cause smart eye-glasses 110 to generate user interfaces corresponding to only one digital workspace as part of VDI 150. Inventors have realized that such user interfaces corresponding to only one digital workspace as a part of VDI 150 limit productivity and user experience. Aspects of the present disclosure relate to providing user interfaces that facilitate better productivity and user experience, as described below with examples.

3. Flowchart

Figure 2:
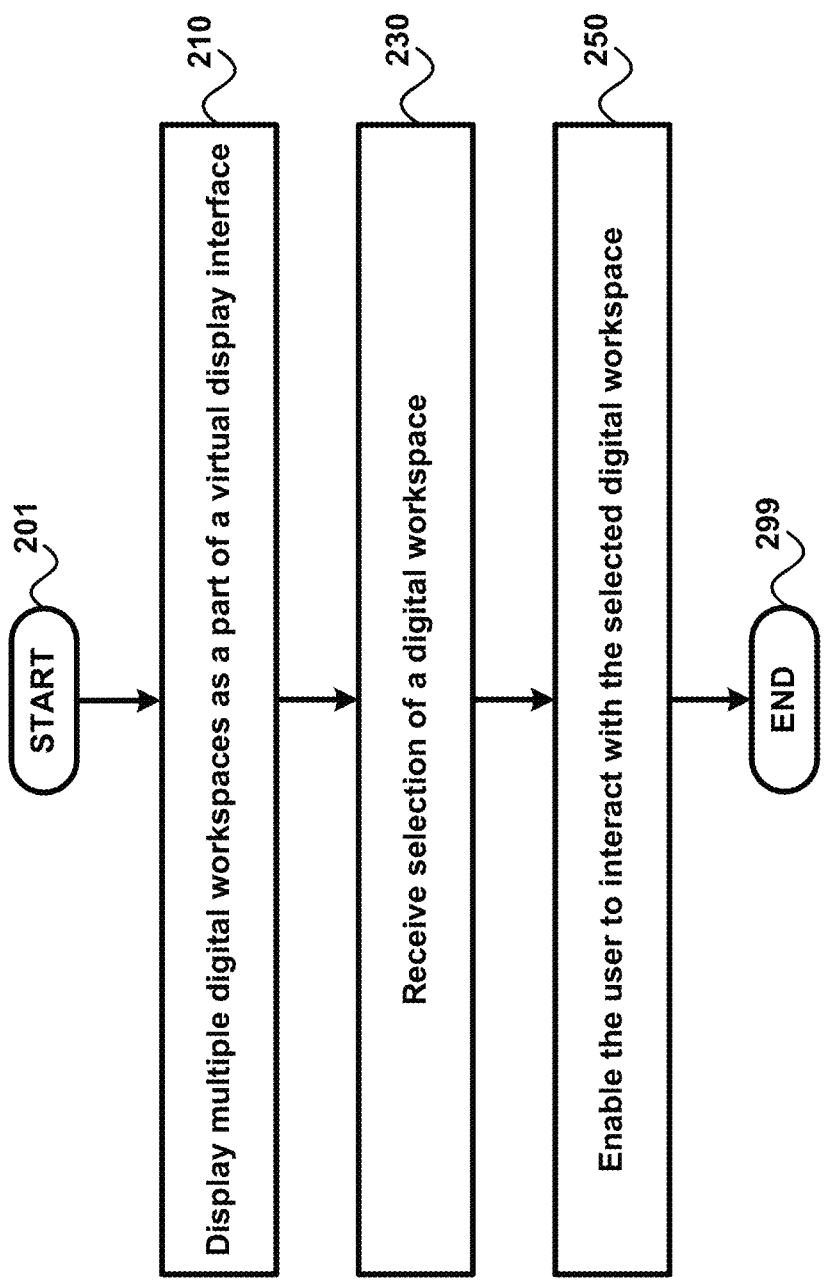
FIG. 2 is a flow chart illustrating the manner in which user interfaces are provided according to an aspect of the present disclosure.

FIG. 2 is a flow chart illustrating the manner in which user interfaces are provided according to an aspect of the present disclosure. The flowchart is described with respect to the systems of FIG. 1 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, processing system 120 sends digital data representing content and commands to smart eye-glasses 110, which causes display of multiple digital workspaces in a same duration (simultaneously) as part of VDI 150. Each digital workspace may be capable of displaying windows and other objects, where a window is a graphical interface element using which an executing software program receives any needed inputs from and provides (e.g., display text or graphic icons) output to users. In an embodiment, the number of digital workspaces displayed depends on the RAM size of processing system 120.

In step 230, processing system 120 receives signals indicating a digital workspace selected by a user, from the multiple digital workspaces displayed as part of VDI 150. The received signals may indicate any one of or any combination of eye gaze of the user, field of view of the user, gestures of the user, control signals received from an input device associated with the user. Processing system 120 may receive the signals from the one or more sensors communicatively connected to the processing system 120. The signals can be in the form of digital data and/or analog signals representing the selection. Processing system 120 processes the received signals and identifies the digital workspace selected by the user.

In step 250, processing system 120 enables the user to interact with the selected digital workspace. In a common operation, one or more objects are displayed to the user in the selected digital workspace, and upon selection of an object a software program corresponding to the selected object is instantiated. In an embodiment, instantiating a software program includes creating a window corresponding to the software program in the selected digital workspace. The flowchart ends in step 299.

While various steps above are described as being sequential for ease of understanding, it may be appreciated that some of the steps can be performed in parallel.

Though the steps above are described with respect to eye-glasses (i.e., two lens), it may be readily appreciated that the above steps can be implemented with even a single eye-glass (i.e., a single lens).

In an embodiment, a software program (such as an operating system) executing in processing system 120 causes processing system 120 to send/receive signals to carry out various operations (including the steps of FIG. 2) disclosed in the present disclosure.

In an embodiment, processing system 120 may verify/authenticate the user before enabling the user to interact with a digital space. Example authentication mechanisms include verifying thumb impressions, retina scanning, voice recognition, user name/password verification etc.

In an embodiment, each digital workspace is sandboxed to create isolated run/test environments.

The description is continued with respect to example user interfaces caused to be generated by processing system 120.

4. Example User Interfaces

FIGS. 3, 4, 5A-5B, 6, 7, 8, 9A-9B and 10A-10D depict various example user interfaces generated by smart eye-glasses 110, based on digital data received from processing system 120.

Figure 3:
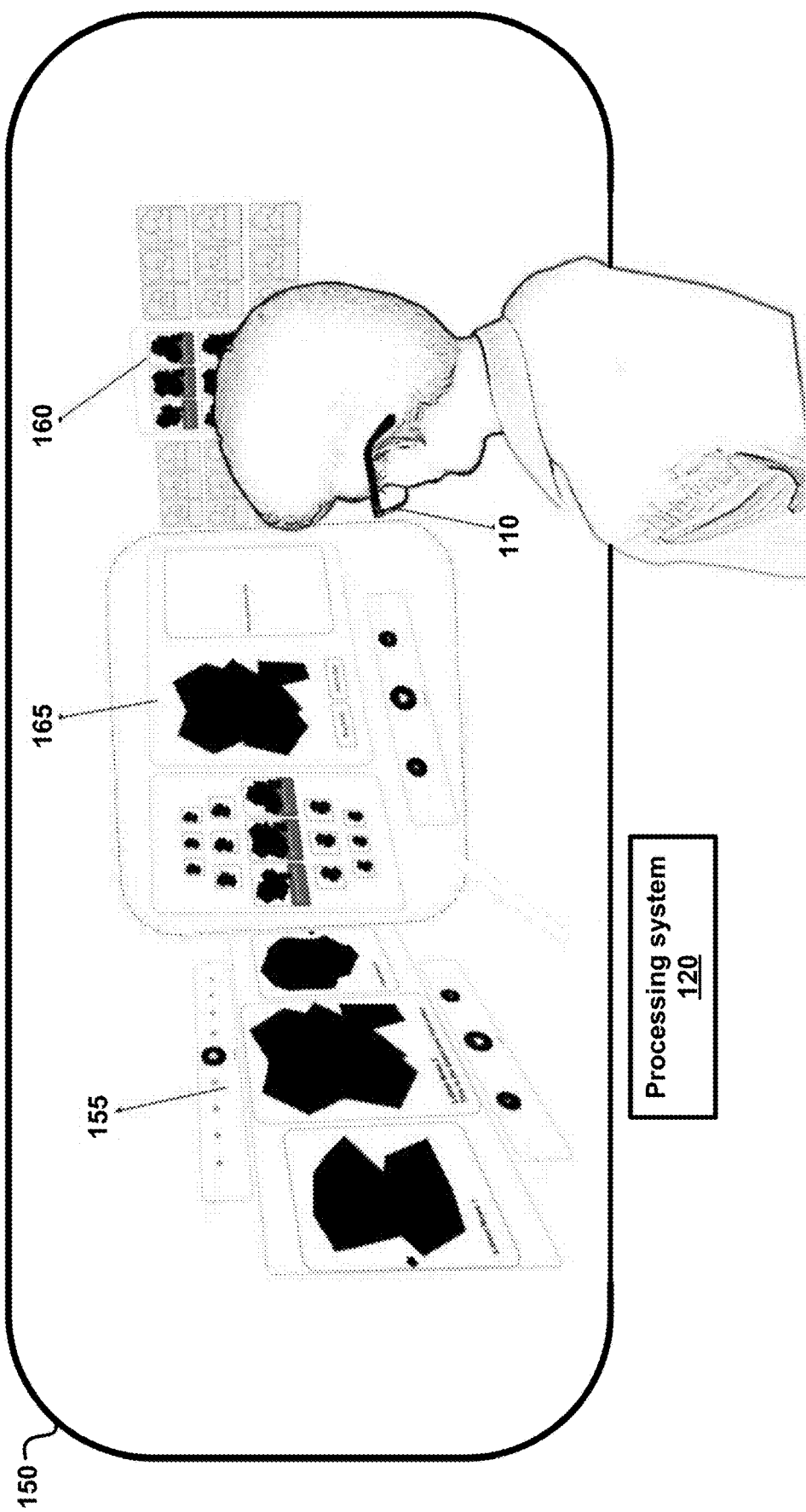

FIG. 3 depicts a user interface with multiple digital workspaces. Processing system 120 sends digital data representing multiple digital workspaces to smart eye-glasses 110 to cause display of the multiple digital workspaces in a same duration as a part of VDI 150, as shown in FIG. 3. In FIG. 3, VDI 150 is shown containing three digital workspaces 155, 160 and 165. Each of digital workspaces 155, 160 and 165 is capable of displaying windows and other objects, as may be readily observed from FIG. 3. Though FIG. 3 is shown depicting only three digital workspaces, it may be readily appreciated that any number (including two) of digital workspaces may be displayed, based on the RAM size of processing system 120. Also, each digital workspace can be of any size.

Processing system 120 receives signals indicating a digital workspace selected by a user from among digital workspaces 155, 160 and 165, processes the received signals, and identifies digital workspace 165 (which is highlighted in dotted lines) as the digital workspace selected by the user. Processing system 120 enables the user to interact with digital workspace 165.

In an example embodiment, the received signals indicate field of view of the user. In an example embodiment, signals indicating the field of view of the user are received from a head tracking sensor communicatively connected to processing system 120, that tracks the head movement of the user. Processing system 120 processes the signals received from the head tracking sensor and determines that the field of view of the user covers digital workspace 165, and thus identifies digital workspace 165 as the digital workspace selected by the user. In case the field of view of the user covers multiple digital workspaces, then the digital workspace that covers a major portion of the field of view of the user is identified as the digital workspace selected by the user.

In an alternative embodiment, the received signals may indicate eye gaze of the user (indicating the digital workspace(s) being gazed by the user) and processing system 120 identifies the digital workspace(s) by processing the received signals. In case the user is gazing at multiple digital workspaces, then the digital workspace that covers a major portion of the eye gaze of the user is identified as the digital workspace selected by the user. The signals indicating eye gaze of the user may be received from an eye-tracking sensor (not shown, but provided potentially external to smart eye-glasses 110) communicatively connected to processing system 120.

In another alternative embodiment, when the field of view of the user covers two digital workspaces, processing system 120 may determine the digital workspace selected by the user based on the eye gaze of the user.

In yet another alternative embodiment, the received signals may indicate the gestures made by the user (for example, hand gestures) or voice commands of the user or the inputs signals received from an input device (such as a mouse, keyboard etc.) associated with the user. Processing system 120 receives/detects the gestures/voice commands/input signals using techniques known in the relevant arts.

In yet another alternative embodiment, the received signals may contain any combination of eye gaze of the user, field of view of the user, gestures of the user, voice commands from the user, and control signals received from an input device associated with said user.

Further, though FIG. 3 depicts processing system 120 as enabling the user to interact with only one digital workspace, it may be readily appreciated that processing system 120 may also enable the user to interact with multiple digital workspaces at the same time, based on the selection of the user.

In an embodiment, processing system 120 may cause a particular digital workspace (for example, a digital workspace that is at the centre of VDI 150) to be displayed, when the head of the user turns beyond VDI 150.

In an embodiment, processing system 120, upon receiving an input (such as special commands through gestures, input devices etc.), may cause a digital workspace to be re-oriented to align with the head movement/position of the user. In an example embodiment, upon detecting two successive mouse clicks, processing system 120 causes the digital workspace to be re-oriented such that the digital workspace also moves (re-orients) with the head movement of the user. In another example embodiment, the digital workspace can be made to be re-oriented by tapping on a temple of smart eye-glasses 110.

In another embodiment, processing system 120 may disregard head movement/eye movement/gestures of the user and may freeze a digital workspace (i.e., cause the display of that particular digital workspace only or in other words, fix the display of that digital workspace). Such a feature is beneficial, as the user can freeze a digital workspace and watch videos etc., while moving.

In yet another embodiment, processing system 120 may provide a bird's-eye view of all the digital workspaces in VDI 150, as may be readily observed from FIG. 3 and FIG. 7 (below). Also, processing system 120 may facilitate switching between bird's-eye view (where all digital workspaces can be viewed) and normal view (where selected digital workspaces can be viewed).

Figure 4:
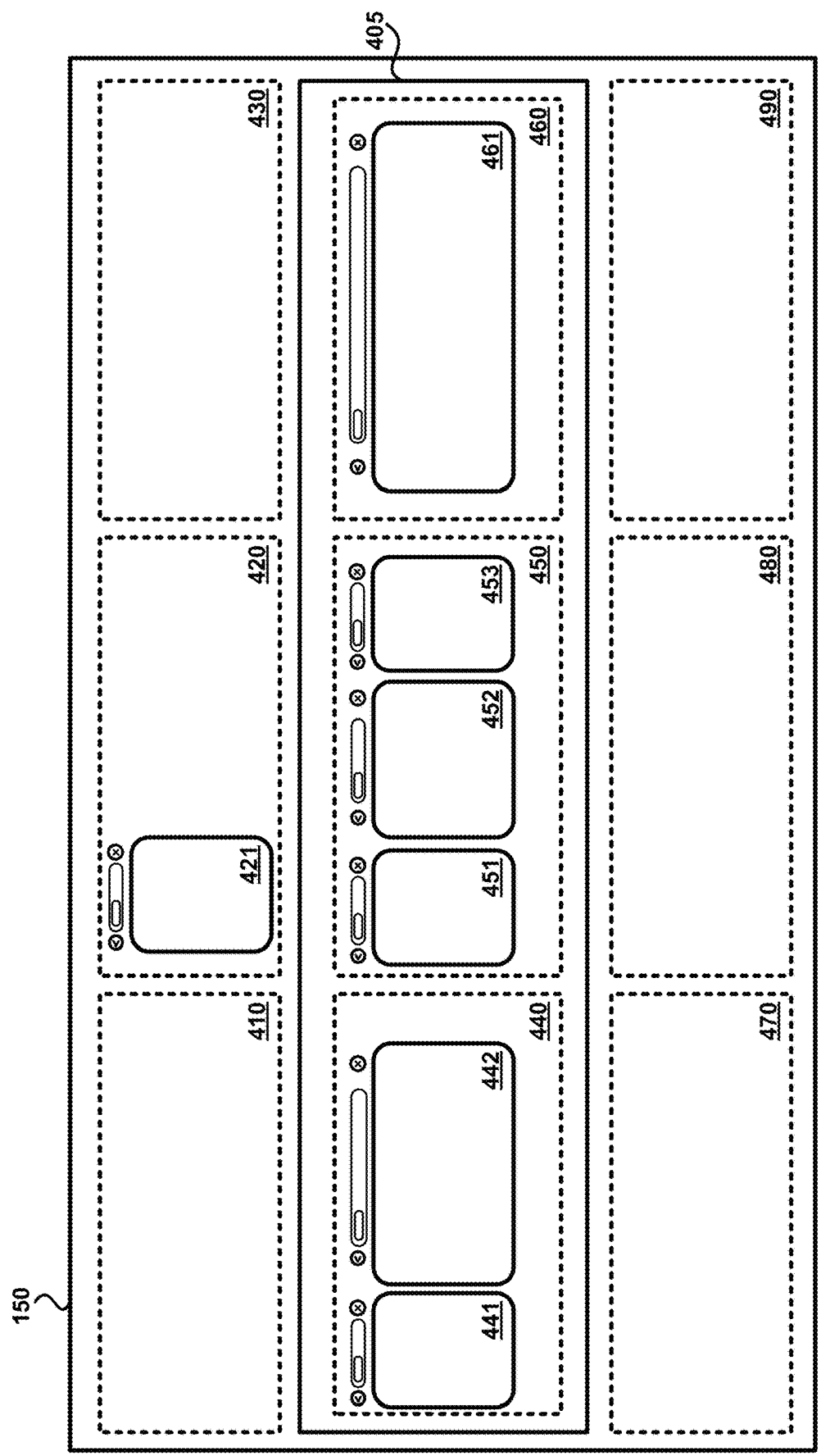

FIG. 4 depicts a user interface with static and dynamic digital workspaces. In FIG. 4, VDI 150 is shown containing digital workspaces 410, 420, 430, 440, 450, 460, 470, 480 and 490, and windows 421, 441, 442, 451, 452, 453 and 461 corresponding to software applications instantiated. Digital workspaces 440, 450 and 460 in portion 405 of VDI 150 are static digital workspaces. In a static digital workspace, windows instantiated will have static sizes, layouts (for example, portrait or landscape) and positions (for example, centre, left, right, top, bottom of digital workspaces etc.), which may be configured using certain policies. Static digital workspaces allow users to offload the overhead of maintaining windows in proper position manually.

Digital workspaces 410, 420, 430, 460, 470 and 480 are dynamic digital workspaces. In dynamic workspaces, sizes, layouts and positions of windows can be changed as per the user's requirement.

In an embodiment, if multiple windows have the same position in a digital workspace (which can be static or dynamic), all the windows will be stacked on one another, with the most recently used window on the top and the least recently used window on the bottom. Thus, only the most recently used window will be visible to the user. However, the software applications corresponding to the windows that are not visible may remain active though not visible. In an alternative embodiment, the software applications corresponding to the windows that are not visible may be suspended and the last states of the software applications may be captured.

In another embodiment, in response to determining that the user is interacting with a particular window, processing system 120 may render visible only that particular window and may render all other digital objects and windows not visible to the user. An advantage of such a feature is that user will not be viewing unnecessary content, therefore may reduce user's distraction.

Though FIG. 4 depicts static digital workspaces in the middle of VDI 150, static digital workspaces can be anywhere in VDI 150. Further, though FIG. 4 depicts the static and the dynamic digital workspaces as contiguous, it may be readily appreciated that they can be non-contiguous too. Further, a digital workspace can be configured to be either a static digital workspace or a dynamic digital workspace.

In an embodiment, windows can be moved from one digital workspace to another, irrespective of the types of source and destination windows i.e., windows can be moved from a static window to another static window, from a static window to a dynamic window, from a dynamic window to a static window, and from a dynamic window to another dynamic window. Further, windows can be moved within a digital space.

Figure 5A:
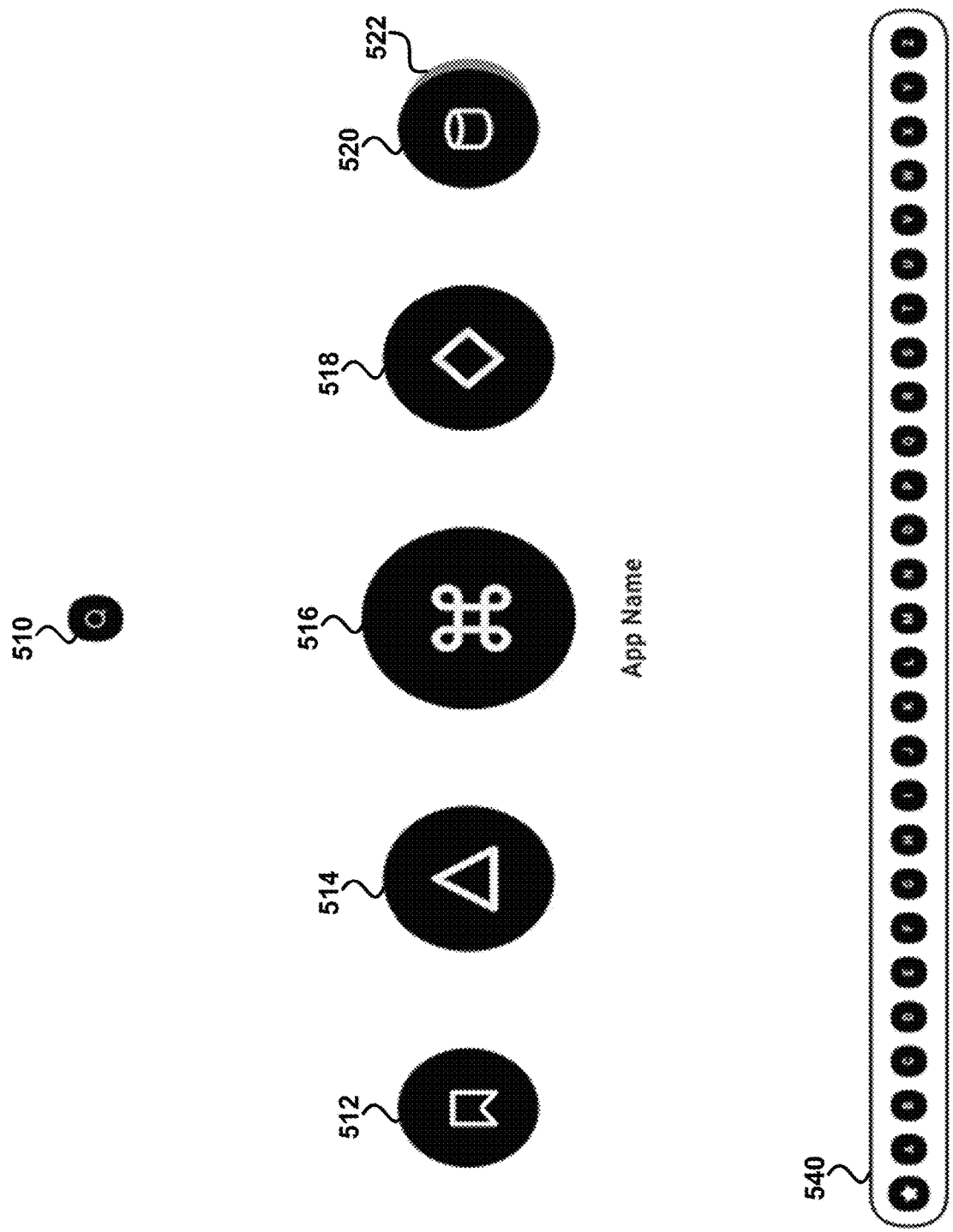

FIGS. 5A and 5B depict how graphic objects corresponding to software applications are organized in digital workspace. FIG. 5A depicts graphic objects 512, 514, 516, 518 and 520, search icon 510, and index 540. Graphic objects 512, 514, 516, 518 and 520, when selected, facilitate instantiation of corresponding software applications/windows. Search icon 510 facilitates searching for interested software applications. Index 540 facilitates organization of software applications in a structured manner. In FIG. 5A, it may be readily appreciated that the software applications are organized on the basis of alphabetical order of the names of the graphic objects. When alphabet 'A' is clicked, user can view the graphic objects whose names start with 'A'.

Icon 522 i.e., shade adjacent to graphical icon 520 indicates availability of further icons on the right side of graphic object 520. If there are no further graphic objects, icon 522 will not be shown. It may be readily appreciated that icon 522 will be shown on the left side of graphic object 512, if there are further icons on the left side of graphic object 512.

The user interface of FIG. 5B is similar to the user interface of FIG. 5A, except that in FIG. 5B, the software applications are organized on the basis of utility of corresponding software applications (such as music, education, email etc.), as may be readily observed from index 580.

Figure 6:
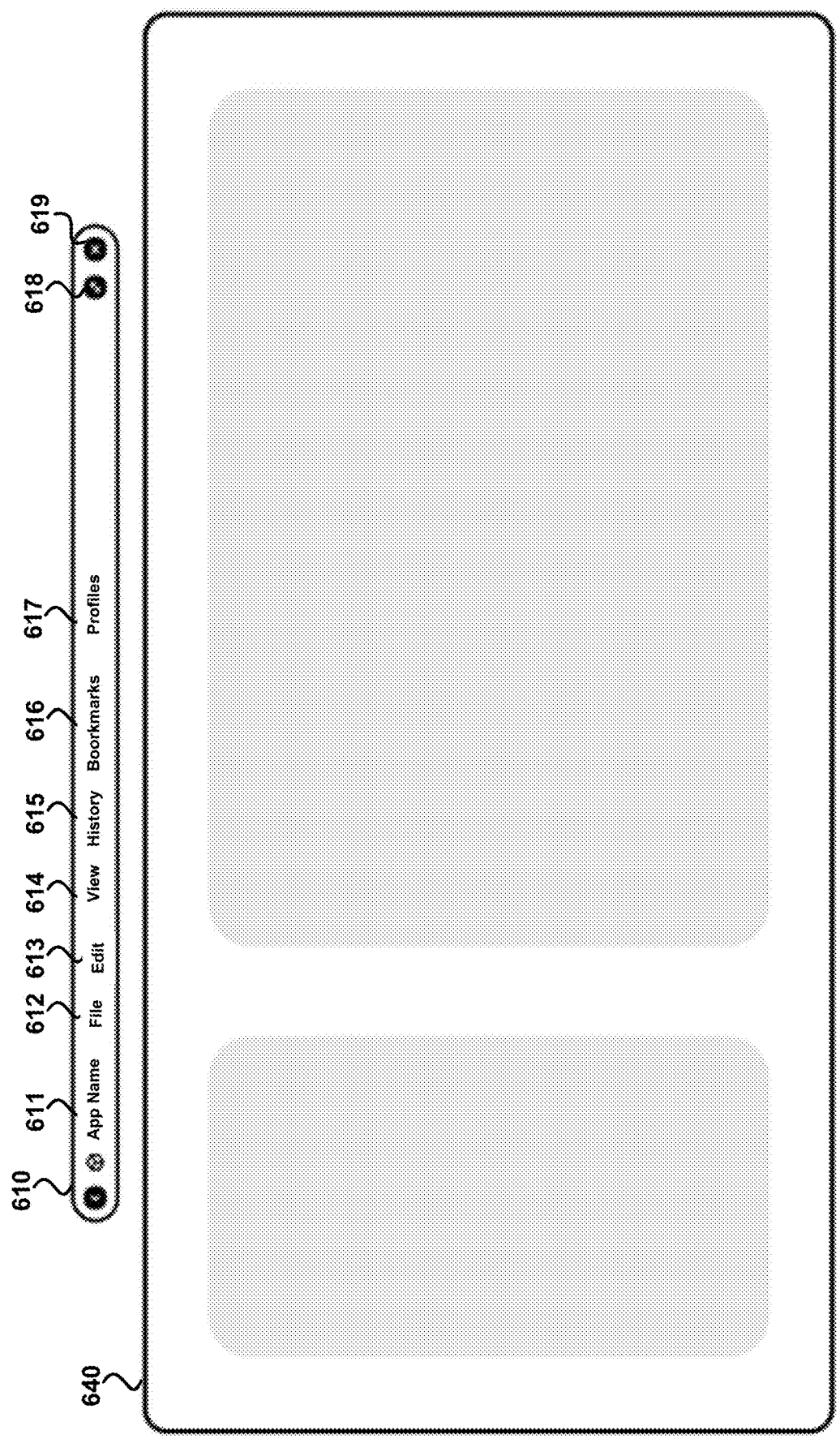

FIG. 6 depicts a user interface related to an application instantiated. FIG. 6 depicts window 640 corresponding to the application instantiated and toolbar 610 associated with window 640. Toolbar 610 contains various software application/window controls and identifications. In FIG. 6, toolbar 610 is shown depicting application name 611, file 612, edit 613, view 614, history 615, bookmarks 616, profiles 617, maximize/minimize option 618, and close option 619. However, it may be readily appreciated that in alternative embodiments, windows may have more or less or different controls and identifications than those shown in FIG. 6.

In an embodiment, toolbar 610 remains hidden and will be visible to the user only when the user interacts with the top of window 640. An advantage of having a toolbar that is separate from corresponding window is that the toolbar will not cover the space meant for the window. In an alternative embodiment, toolbar 610 is integrated with window 640.

In another embodiment, toolbar 610 facilitates movement of window 640. Window 640 can be moved (within a digital workspace or between digital workspaces) by dragging toolbar 610. In an alternative embodiment, window 640 can be moved by clicking (for example, with mouse) anywhere on window 640 and dragging to desired destination. In an example embodiment, the user can right click anywhere on window 640 and drag window 640 to a required position within the same digital workspace or to another digital workspace.

Further, in another embodiment, processing system 120 may change the brightness level and/or color of window 640 based on ambient light condition. In an example embodiment, if the ambient light is above a threshold value, then processing system 120 will increase the brightness of window 640. Similarly, if the ambient light is equal to or below the threshold value, processing system 120 will reduce the brightness (for example, may apply a dark theme) of window 640. This allows the user to view the contents comfortably. An advantage of such a technique is that it facilitates variation of brightness/color theme at pixel level. An advantage of such a technique is that it facilitates variation of brightness/color at pixel level.

Similarly, the brightness level and/or color of the window may be changed based on the brightness level and/or color objects in the physical environment around the user. For example, if the physical environment around the user has a blue color wall whose brightness level is above the threshold value and an orange color photo frame whose brightness level is below the threshold value, then processing system 120 will identify the brightness and the color themes of the blue color wall and the orange color photo frame, and will adjust the brightness/color of the window such that the content on top of the blue color wall will have higher pixel brightness and the remaining pixels will have lower brightness.

In another embodiment, processing system 120 allows splitting of window 640 into multiple windows. The window(s) split out of window 640 may be maintained in the same digital workspace or may be moved to another digital workspace.

Figure 7:
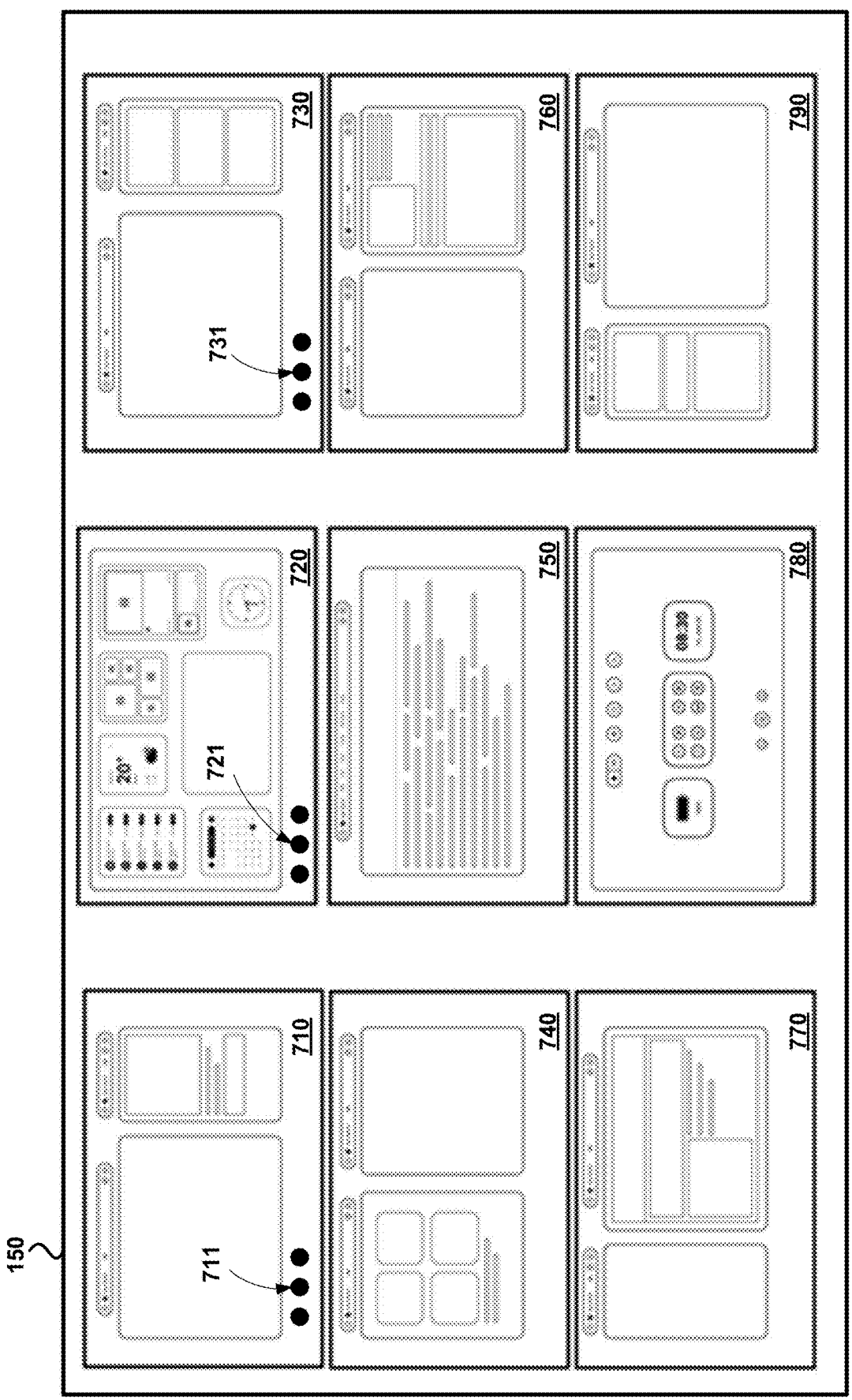

FIG. 7 depicts a user interface with multiple digital workspaces, with each digital workspace containing one or more windows. FIG. 7 is shown depicting digital workspaces 710, 720, 730, 740, 750, 760, 770, 780 and 790 containing windows corresponding to various software applications instantiated. Digital workspaces 710, 720 and 730 are also shown depicting recently used applications menu's 711, 721 and 731 respectively. A recent application can be re-instantiated from a recently used applications menu by selecting corresponding graphical object.

In an embodiment, if a user has not interacted with a digital workspace for a period above a threshold period, processing system 120 may suspend the software applications in that digital workspace. In an example embodiment, processing system 120 maintains a timer to calculate period of inactivity. Processing system 120 may also capture the last states of the suspended software applications, and may cause the last states to be displayed. Processing system 120 may resume the suspended software applications at later time in response to determining a user interaction with the digital workspace again. Processing system 120 may also update the latest states of the resumed software applications. Such a technique optimizes the memory and processor usage of processing system 120, since the resources occupied by the software applications in the digital workspaces with which the user has not interacted for some time can be released for software applications running in an active digital workspace.

Further, in FIG. 7, digital workspace 720 (i.e., middle digital workspace in first row) is shown containing widgets (such as clock, temperature etc.), whereas digital workspace 780 (i.e., middle digital workspace in third row) is shown containing system controls (such as Wi-Fi, Bluetooth etc.) and notifications. Such predetermined placement for the widgets and system controls which are frequently accessed facilitates better user experience, as the user can easily access them without disturbing other digital workspaces. However, in alternative embodiments, the placement of the widgets, system controls and notifications can be anywhere.

Figure 8:
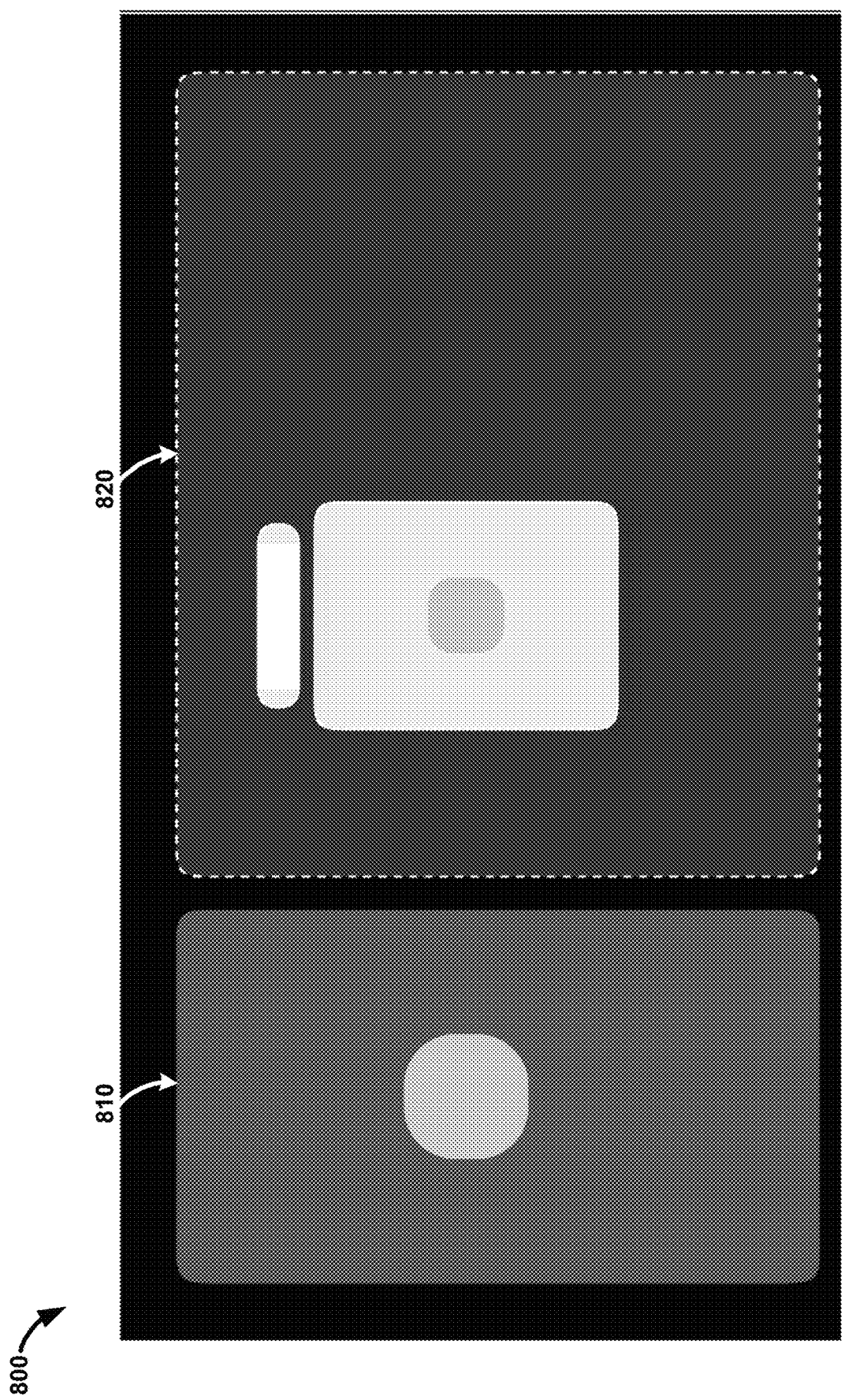

FIG. 8 depicts a user interface indicating a free/available slot in a digital workspace. In FIG. 8, digital workspace 800 is shown as containing two slots for windows i.e., slot 810 and 820. Slot 820 is indicated as free/available by showing slot 820 in dotted lines. This feature is beneficial when a window is being moved from one digital space to another. Also, this feature is beneficial when a window corresponding to an application is split into two.

Figure 9A:
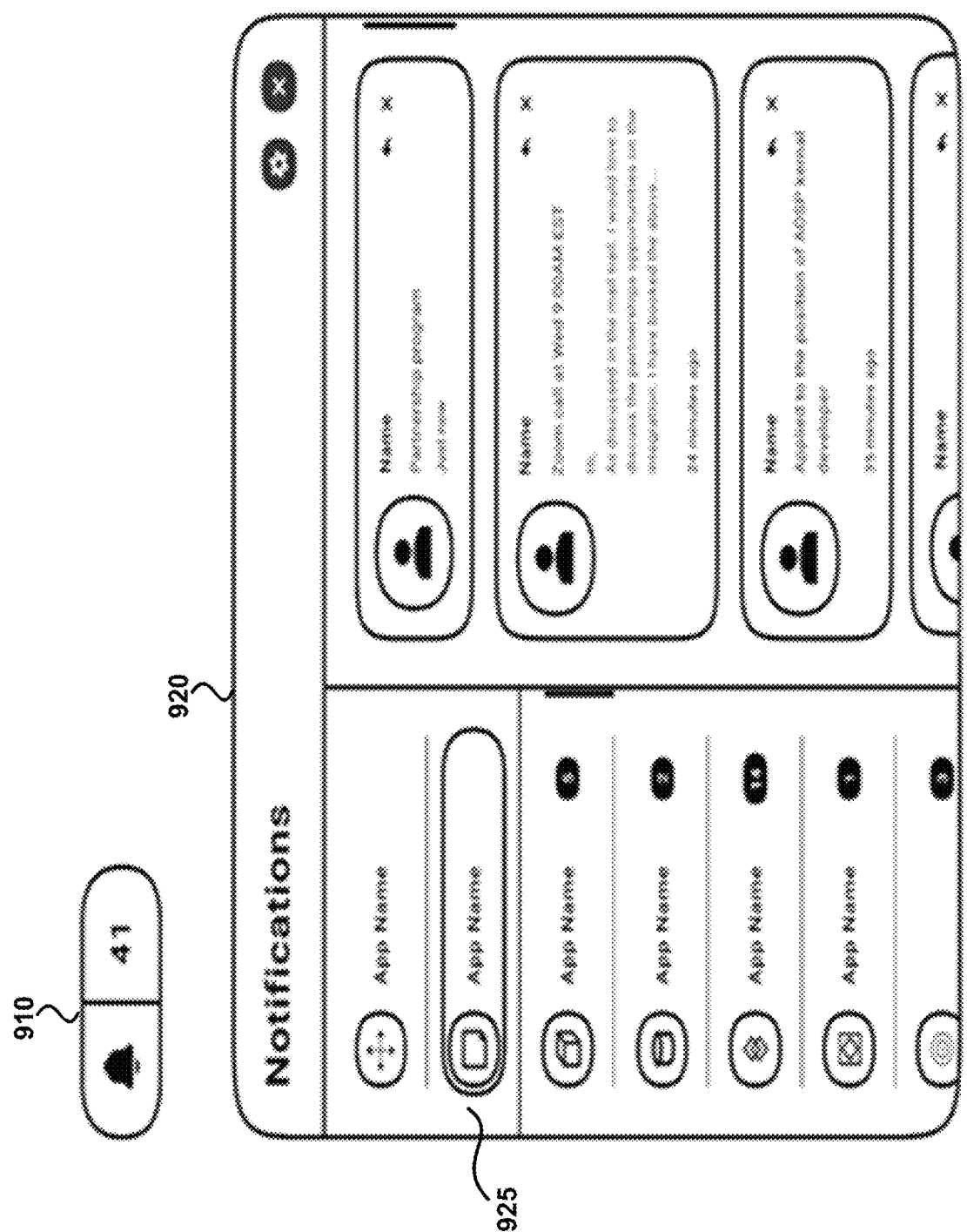

FIG. 9A depicts an example user interface depicting notifications. FIG. 9A is shown depicting notifications summary icon 910 and notifications window 920. Notifications' summary icon 910 indicates the total number of notifications, and notifications window 920 shows the details of the notifications. As may be readily observed from notifications window 920, the notifications are grouped according to the corresponding software applications. Section 925 indicates priority notifications. An advantage of such a user interface is that priority software applications will always be shown at the top so that the user can easily view those notifications.

When a software application is chosen, the notifications corresponding to that software application can be seen on the right-hand side of notifications window 920 as shown in FIG. 9A. As may be readily observed from FIG. 9A, the user interface provides various options to the user such as replying to the notification, closing the notification etc. In alternative embodiments, the user interface may provide other options based on the type/nature of the corresponding software applications.

Figure 9B:
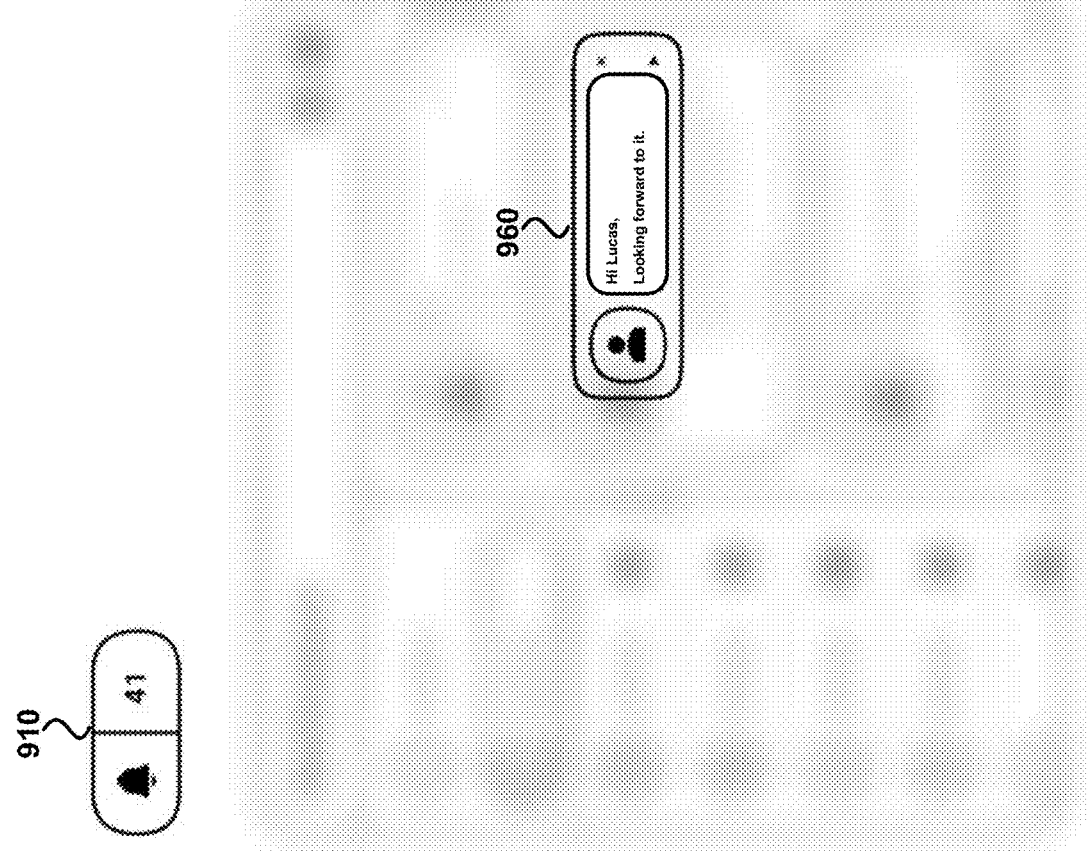

When the user selects the reply option in FIG. 9A, the user will be presented with a user interface as depicted in FIG. 9B. As may be readily observed from FIG. 9B, the user interface of FIG. 9A will be blurred, so that the user can view only the required information. However, in alternative embodiments, the user interface of FIG. 9A may also be visible or may be completely not visible (instead of blurring).

Figure 10A:
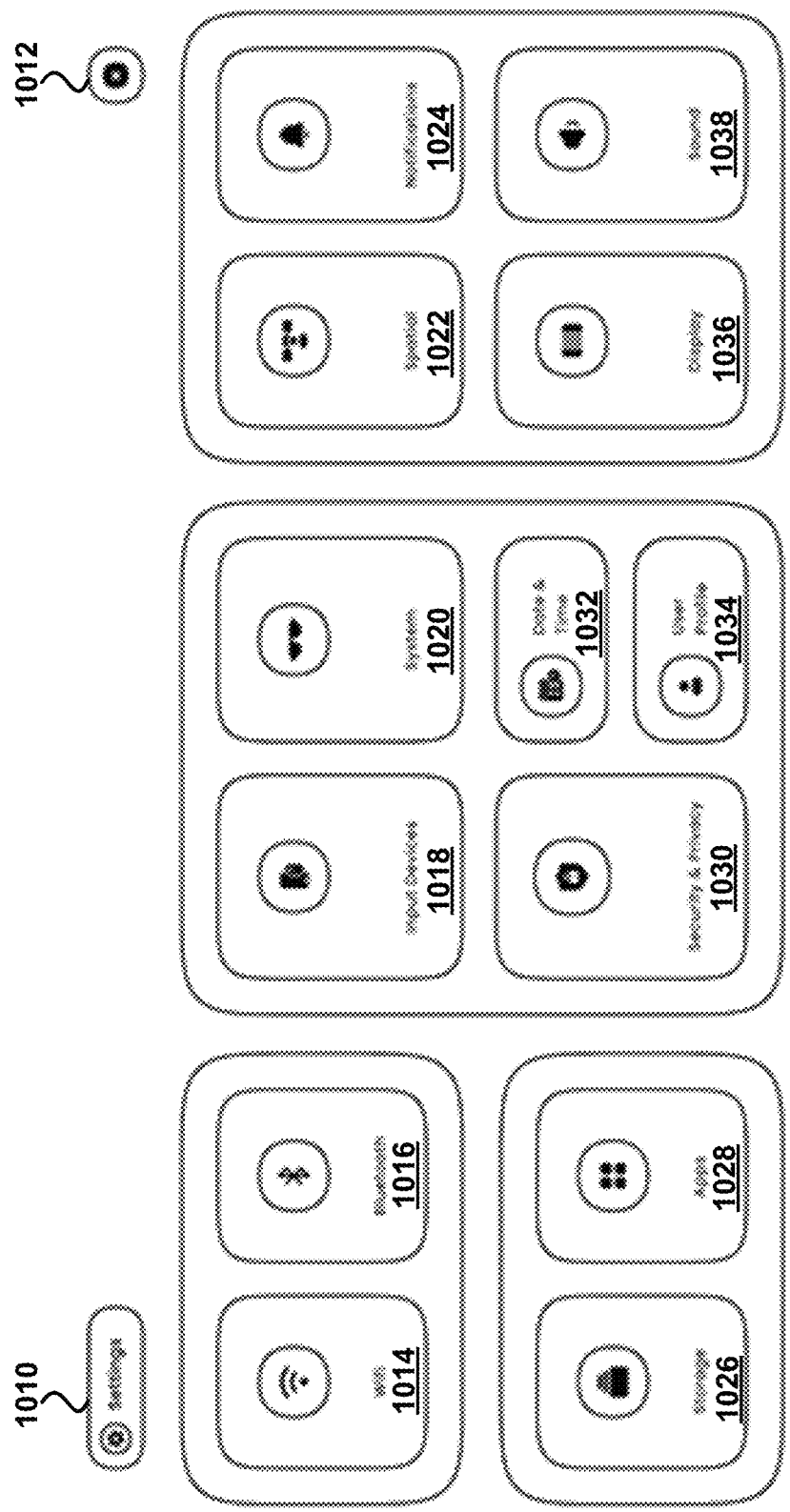
Figure 10B:
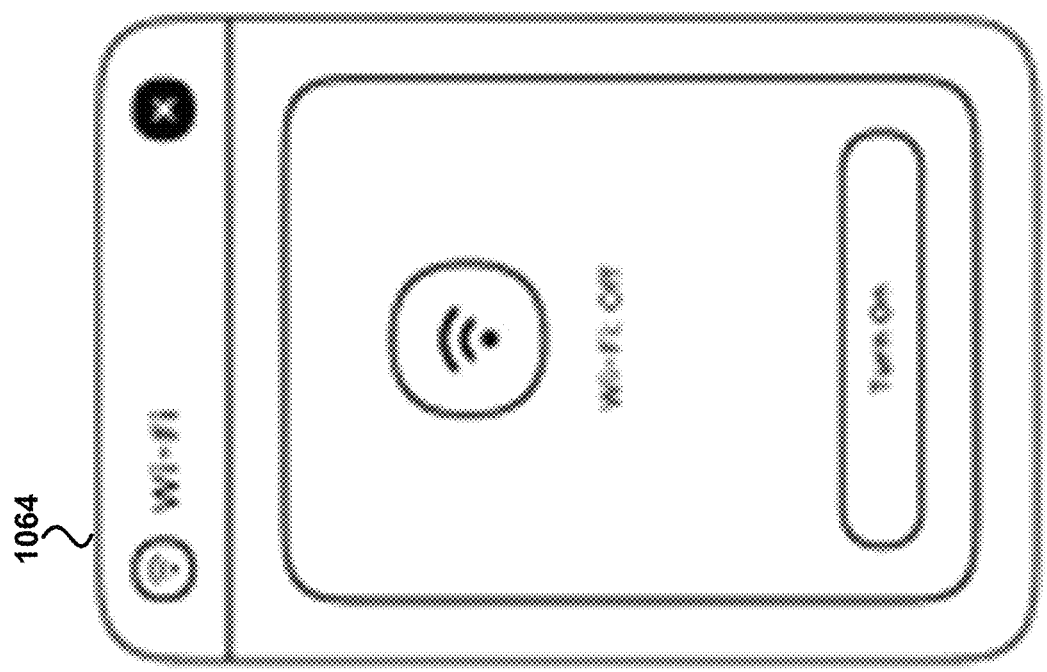
Figure 10C:
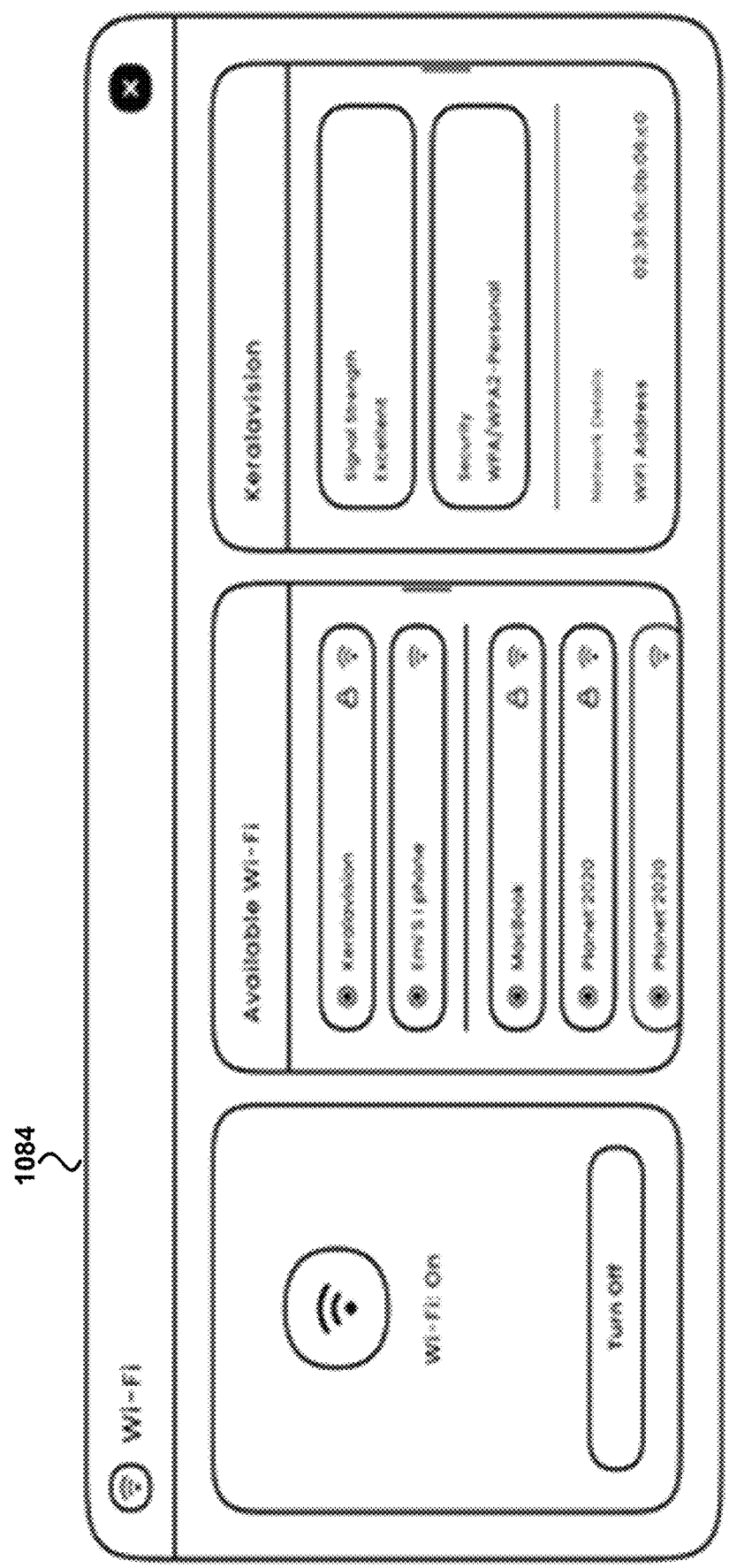
Figure 10D:
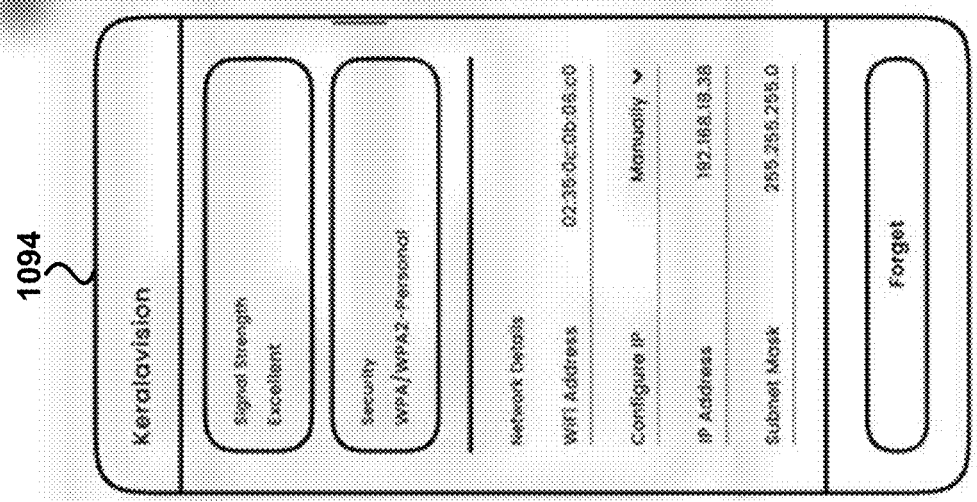

FIG. 10A depicts a user interface for various system settings. FIG. 10A depicts window 1010 for system settings and icon 1012 provides an option for closing window 1010. Icons 1014-1038 correspond to various systems. When icon 1014 corresponding to Wi-Fi is selected, window 1064 of FIG. 10B gets generated. In FIG. 10B, Wi-Fi is indicated as 'Off'. When the 'Turn On' option is selected, window 1084 of FIG. 10C gets generated with further details such as available Wi-Fi networks and details of the available Wi-Fi networks. When Wi-Fi network "Keralavision" is chosen, window 1094 of FIG. 10D gets generated with further details of the Wi-Fi network "Keralavision". It may be readily observed that the window in FIG. 10D is vertically expanded. In alternative embodiments, the window can be horizontally expandable. In an example embodiment, windows 1064, 1074, 1084 and 1094 are expandable both horizontally and vertically.

In an embodiment, a "toggle button" may be used to allow the user to change a setting between two states (i.e., between ON/OFF).

An advantage of the user interfaces as depicted in FIGS. 10A-10D is that they show less content to reduce user distraction.

Also, it may be readily appreciated that the user interfaces of present disclosure improve productivity and user experience.

The description is continued with respect to internal architecture of smart eye-glasses 110.

5. Internal Architecture of Smart Eye-Glasses

Figure 11:
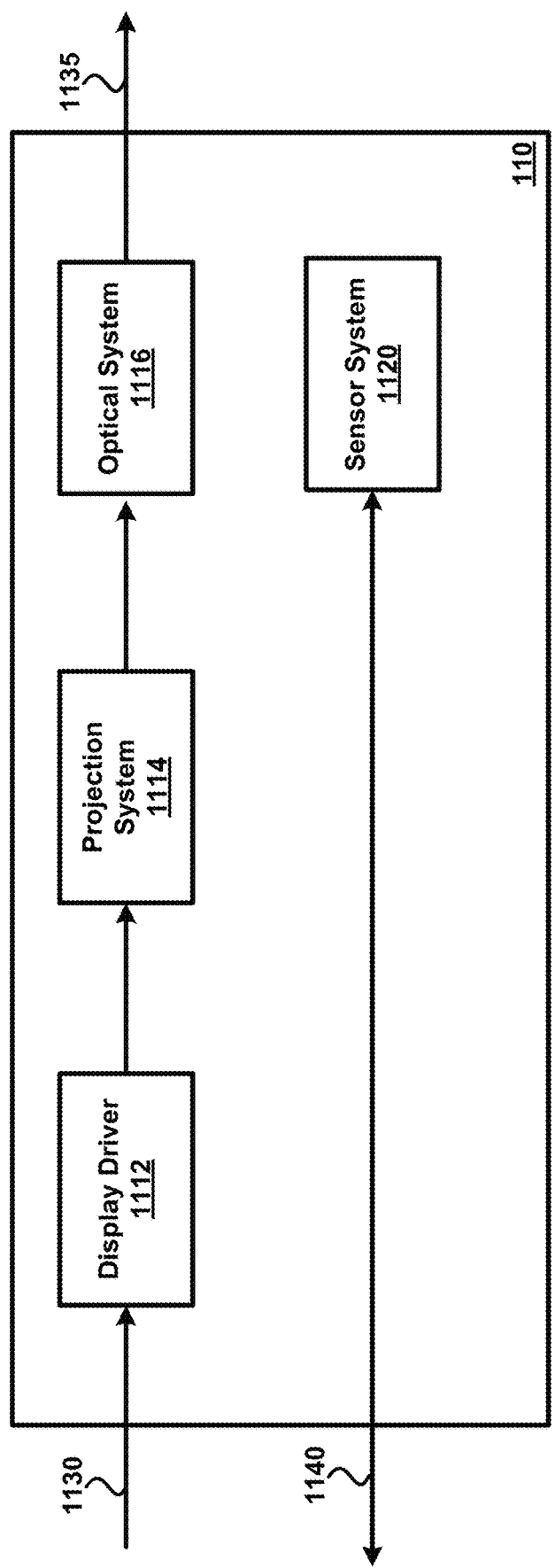
FIG. 11 is a block diagram illustrating the internal architecture of smart eye-glasses, according to an aspect of the present invention.

FIG. 11 is a block diagram illustrating the internal architecture of smart eye-glasses 110, according to an aspect of the present disclosure. In FIG. 11, smart eye-glasses 110 is shown containing display driver 1112, projection system 1114, optical system 1116, and sensor system 1120. FIG. 11 is shown with a representative set of components merely for illustration, though typical environments employing aspects of the present disclosure can have many more types and number of systems.

Display driver 1112 acts as an interface between processing system 120 and projection system 1114. Display driver 1112 receives digital data representing content (such as image frames) and commands (for example, to control brightness and resolution) from processing system 120 via path 1130 and generates signals to cause display of desired user interfaces. Display driver 1112 is to be implemented consistent with projection system 1114, as will be apparent to a skilled practitioner. In an example embodiment, display driver 1112 is implemented with OVP923 product available from Omnivision, 4275 Burton Drive, Santa Clara, California 95054.

Projection system 1114 receives signals from display driver 1112, and projects light onto optical system 1116. The light projected by projection system 1114 varies based on the signals received from display driver 1112. In an example embodiment, projection system 1114 is implemented with the combination of one or more LEDs and OVP2200 also available from Omnivision noted above.

Optical system 1116 reflects the incident light onto user's eyes. One or more lens present in optical system 1116 cause the reflection of the incident light onto user's eyes (shown as path 1135 in FIG. 11). The light rays, upon entering into user's eyes, cause visual experience (user interfaces) corresponding to the light rays, thereby enabling the user to view the user interfaces as part of VDI 150. VDI 150 will generally be at a distance of about 0.5 metre and beyond. An example embodiment of optical system 1116 is implemented with AW70s product available from Lingxi-AR Technology Co., Ltd., 815, Jinao International, No. 17 Madian East Road, Haidian District, Beijing or Crystal50 product available from DigiLens Inc., 1276 Hammerwood Avenue, Sunnyvale, California 94089.

Sensor system 1120 includes one or more sensors. The sensors in sensor system 1120 are communicatively coupled to processing system 120 and send the sensed data to processing system 120 via path 1140. Also, the sensors in sensor system 1120 may receive commands/data from processing system 120, and provide responses to the commands.

Sensor system 1120 may contain sensors such as accelerometer, gyrometer, magnetometer, ambient light sensor, inertial measurement unit (IMU), RGB cameras, IR cameras, eye-tracking sensor, head-tracking sensor, microphone, electromyography (EMG) sensor, electrocardiogram (ECG) sensor and neural sensor.

Some of the sensors (such as head-tracking sensor and eye-tracking sensor) track the head movement and eye gaze of the user, and send the corresponding signals to processing system 120 which causes display of user interfaces accordingly.

Though display driver 1112 is shown as part of smart eye-glasses 110, in alternative embodiments, display driver 1112 is outside smart eye-glasses 110.

Though not shown in FIG. 11, in an embodiment, device driver 1112 contains a frame buffer to store the image frame received from processing system 120.

In an embodiment, smart eye-glasses 110 provide partially transparent visuals without obscuring the real-world view.

It should be further appreciated that the features described above can be implemented in various embodiments as a desired combination of one or more of hardware, software, and firmware. The description is continued with respect to an embodiment in which various features are operative when the software instructions described above are executed.

6. Digital Processing System

Figure 12:
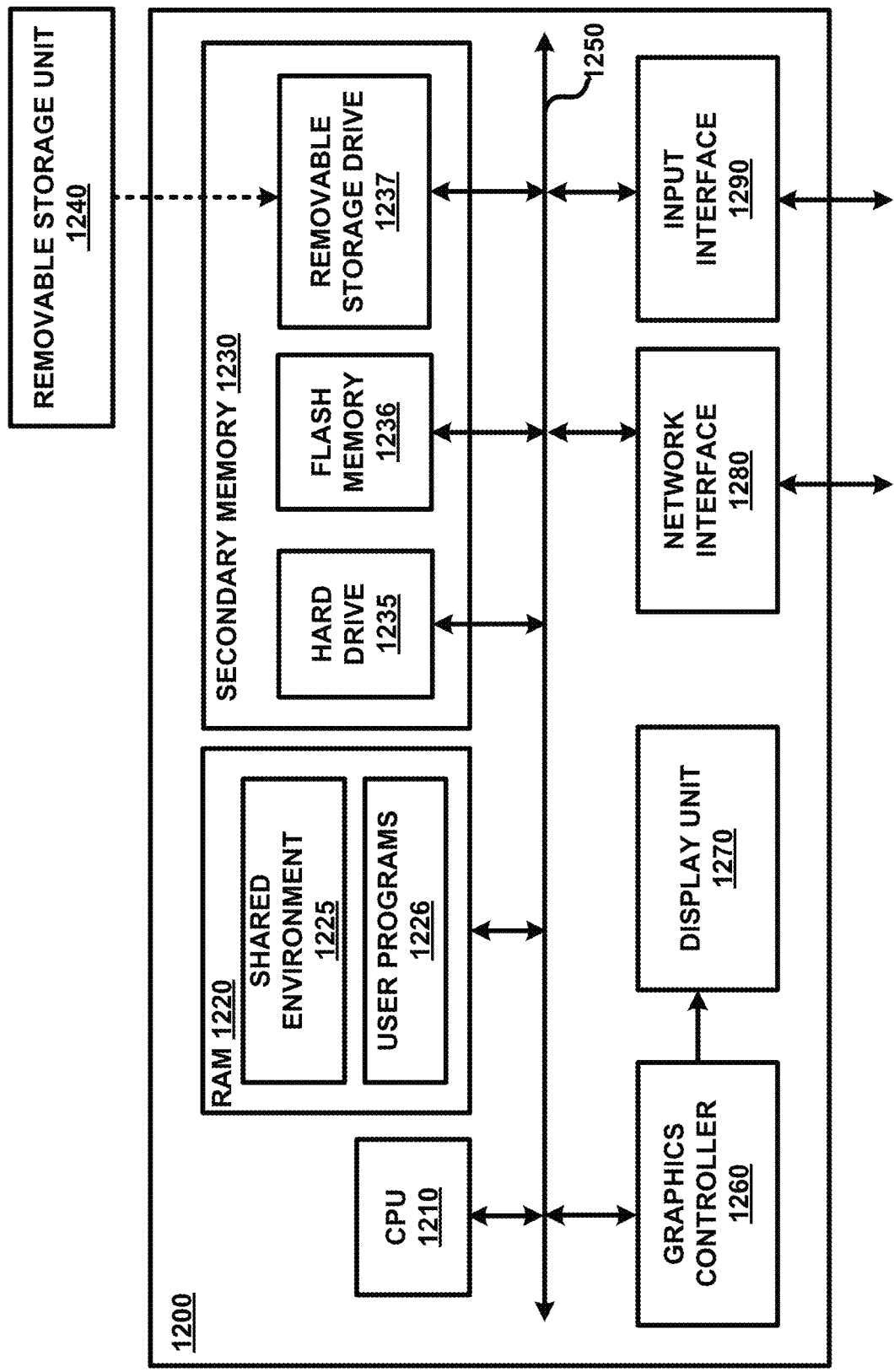
FIG. 12 is a block diagram illustrating the details of a digital processing system in which several aspects of the present disclosure are operative by execution of appropriate executable modules.

FIG. 12 is a block diagram illustrating the details of digital processing system 1200 in which various aspects of the present disclosure are operative by execution of appropriate executable modules. Digital processing system 1200 may correspond to processing system 120.

Digital processing system 1200 may contain one or more processors such as a central processing unit (CPU) 1210, random access memory (RAM) 1220, secondary memory 1230, graphics controller 1260, display unit 1270, network interface 1280, and input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present disclosure. CPU 1210 may contain multiple processing units, with each processing unit potentially being designed for a specific task. Alternatively, CPU 1210 may contain only a single general-purpose processing unit.

RAM 1220 may receive instructions from secondary memory 1230 using communication path 1250. RAM 1220 is shown currently containing software instructions constituting shared environment 1225 and/or other user programs 1226 (such as software applications, etc.). Shared environment 1225 contains software programs such as device drivers, operating systems, virtual machines, containers, etc., which provide a (shared) run time environment for execution of other/user programs. A combination of such software programs, as applicable in the pertinent computing environment, for execution of programs including those specifically implementing the features noted above, may be referred to as system utilities.

Graphics controller 1260 generates display signals (e.g., in RGB format) to display unit 1270 based on data/instructions received from CPU 1210. Display unit 1270 contains a display screen to display the images defined by the display signals. Input interface 1290 may correspond to a keyboard and a pointing device (e.g., touch-pad, mouse) and may be used to provide inputs. Network interface 1280 provides connectivity to a network (e.g., using Internet Protocol), and may be used to communicate with smart eye-glasses 110 (of FIG. 1).

Secondary memory 1230 may contain hard drive 1235, flash memory 1236, and removable storage drive 1237. Secondary memory 1230 may store the data and software instructions (for example, for implementing the various features of the present disclosure as shown in FIG. 2, etc.), which enable digital processing system 1200 to provide several features in accordance with the present disclosure. The code/instructions stored in secondary memory 1230 may either be copied to RAM 1220 prior to execution by CPU 1210 for higher execution speeds, or may be directly executed by CPU 1210.

Some or all of the data and instructions may be provided on removable storage unit 1240, and the data and instructions may be read and provided by removable storage drive 1237 to CPU 1210. Removable storage unit 1240 may be implemented using medium and storage format compatible with removable storage drive 1237 such that removable storage drive 1237 can read the data and instructions. Thus, removable storage unit 1240 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1240 or hard disk installed in hard drive 1235. These computer program products are means for providing software to digital processing system 1200. CPU 1210 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1230. Volatile media includes dynamic memory, such as RAM 1220. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1250. Transmission media can also take the form of acoustic or light waves, such as those generated during radio-wave and infra-red data communications.

In an embodiment where processing system 120 is integrated into smart eye-glasses 120, processing system 120 may not contain some of the above noted elements, as will be readily apparent to a skilled practitioner.

Also, in some embodiments, where processing system 120 is a small portable device (such as a mobile device), processing system 120 may not contain some of the above noted elements, as will be readily apparent to a skilled practitioner.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine readable medium storing one or more sequences of instructions, wherein execution of said one or more instructions by one or more processors contained in a digital processing system causes the digital processing system to perform the actions of:
   sending a first digital data representing a plurality of digital workspaces to a smart eye-glass to cause display of said plurality of digital workspaces in a same duration as a part of a virtual display interface (VDI);
   receiving a first signal indicating the selection of a first digital workspace of said plurality of digital workspaces by a user;
   enabling said user to interact with said first digital workspace of said plurality of digital workspaces, wherein said enabling comprises:
      sending a second digital data representing one or more objects to said smart eye-glass to cause display of said one or more objects in said first digital workspace;
      receiving a second signal indicating a selection of a first object from said one or more objects; and
      instantiating a first software program corresponding to said selected first object, wherein said instantiating comprises creating a first window corresponding to said first software program in said first digital workspace, wherein a plurality of software programs including said first software program are instantiated to cause creation of a respective plurality of windows including said first window; and
   providing notifications corresponding to one or more software programs of said plurality of software programs instantiated, wherein notifications corresponding to a first set of software programs are given priority over the notifications corresponding to other software programs of said one or more software programs.

2. The non-transitory machine readable medium of claim 1 wherein said providing notifications comprises:
   grouping notifications corresponding to each of said one or more software programs into a corresponding group, wherein the groups of notifications corresponding to each of said first set of software programs are given priority over the groups of notifications corresponding to said other software programs.

3. The non-transitory machine readable medium of claim 2, further comprising one or more instructions for:
   enabling said user to select one software program of said one or more software programs; and
   displaying notifications of the group of notifications corresponding to the selected one software program.

4. The non-transitory machine readable medium of claim 3, further comprising one or more instructions for:
   sending for display a notifications window containing a first part and a second part,
   wherein said first part lists said one or more software programs, wherein said user selects said one software program of said one or more software programs, and
   wherein said second part displays the notifications corresponding to said selected one software program.

5. The non-transitory machine readable medium of claim 4, wherein said first part contains a first sub-part and a second sub-part, wherein said first sub-part contains listing of said first set of software programs and said second sub-part contains listing of said other software programs, wherein said first sub-part is displayed to show higher priority over said second sub-part.

6. The non-transitory machine readable medium of claim 5, wherein said first sub-part is shown on top of said second sub-part.

7. A non-transitory machine readable medium storing one or more sequences of instructions, wherein execution of said one or more instructions by one or more processors contained in a digital processing system causes the digital processing system to perform the actions of:
   sending a first digital data representing a plurality of digital workspaces to a smart eye-glass, wherein each digital workspace comprises a plurality of objects with each object corresponding to a software program, wherein said plurality of digital workspaces are displayed as a part of a virtual display interface (VDI); and enabling a user to interact with said plurality of digital workspaces, wherein said enabling comprises selection of one or more objects in each digital workspace to instantiate corresponding software programs in the digital workspace, wherein instantiation of each software program causes creation of a corresponding window in the digital workspace to enable said user to use the software program, wherein each of said one or more digital workspaces comprises a corresponding recently used applications menu which can be used to re-instantiate a recently used software program in the digital workspace.

8. A non-transitory machine readable medium storing one or more sequences of instructions, wherein execution of said one or more instructions by one or more processors contained in a digital processing system causes the digital processing system to perform the actions of:

sending for display a first window containing a plurality of icons, wherein each icon corresponding to a respective setting of a system;

receiving from a user a selection of a first icon of said plurality of icons;

sending for display a second window super-imposed only in part on said first window such that both of said second window and said first window are displayed simultaneously, wherein said second window enables said user to configure the setting corresponding to said first icon.

9. The non-transitory machine readable medium of claim 8, wherein said first window is blurred such that said second window is visible predominantly.

10. A method performed by a processing system associated with a wearable smart eye-glass, said method comprising:

sending a first digital data representing a plurality of digital workspaces to said smart eye-glass to cause display of said plurality of digital workspaces in a same duration as a part of a virtual display interface (VDI);

receiving a first signal indicating the selection of a first digital workspace of said plurality of digital workspaces by a user;

enabling said user to interact with said first digital workspace of said plurality of digital workspaces, wherein said enabling comprises:

sending a second digital data representing one or more objects to said smart eye-glass to cause display of said one or more objects in said first digital workspace;

receiving a second signal indicating a selection of a first object from said one or more objects; and instantiating a first software program corresponding to said selected first object, wherein said instantiating comprises creating a first window corresponding to said first software program in said first digital workspace, wherein a plurality of software programs including said first software program are instantiated to cause creation of a respective plurality of windows including said first window; and providing notifications corresponding to one or more software programs of said plurality of software programs instantiated, wherein notifications corresponding to a first set of software programs are given priority over the notifications corresponding to other software programs of said one or more software programs.

11. The method of claim 10 wherein said providing notifications comprises:

grouping notifications corresponding to each of said one or more software programs into a corresponding group, wherein the groups of notifications corresponding to each of said first set of software programs are given priority over the groups of notifications corresponding to said other software programs.

12. The method of claim 11, wherein said method further comprises:

enabling said user to select one software program of said one or more software programs; and displaying notifications of the group of notifications corresponding to the selected one software program.

13. The method of claim 12, wherein said method further comprises:

sending for display a notifications window containing a first part and a second part, wherein said first part lists said one or more software programs, wherein said user selects said one software program of said one or more software programs, and wherein said second part displays the notifications corresponding to said selected one software program.

14. The method of claim 13, wherein said first part contains a first sub-part and a second sub-part, wherein said first sub-part contains listing of said first set of software programs and said second sub-part contains listing of said other software programs, wherein said first sub-part is displayed to show higher priority over said second sub-part.

15. The method of claim 14, wherein said first sub-part is shown on top of said second sub-part.

16. The method of claim 10, wherein each digital workspace of said plurality of digital workspaces comprises a corresponding plurality of objects with each object corresponding to a software program, wherein said plurality of digital workspaces are displayed as a part of a virtual display interface (VDI); and enabling said user to interact with said plurality of digital workspaces, wherein said enabling comprises selection of one or more objects in each digital workspace to instantiate corresponding software programs in the digital workspace, wherein instantiation of each software program causes creation of a corresponding window in the digital workspace to enable said user to use the software program, wherein each of said one or more digital workspaces comprises a corresponding recently used applications menu which can be used to re-instantiate a recently used software program in the digital workspace.

17. The method of claim 10, further comprising:

sending for display a second window containing a plurality of icons, wherein each icon corresponding to a respective setting of said system;

receiving from said user a selection of a first icon of said plurality of icons;

sending for display a third window super-imposed only in part on said first window such that both of said second window and said first window are displayed simultaneously, wherein said second window enables said user to configure the setting corresponding to said first icon.

18. The method of claim 17, wherein said first window is blurred such that said second window is visible predominantly.

* * * * *